US011172132B1

(12) United States Patent
Delaney et al.

(10) Patent No.: US 11,172,132 B1
(45) Date of Patent: Nov. 9, 2021

(54) IMAGE SAVE ORIENTATION DETERMINED BASED ON ORIENTATION OF OBJECT WITHIN IMAGE (71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/850,990

(22) Filed: Apr. 16, 2020

(51) Int. Cl.
*H04N 5/232* (2006.01)
(52) U.S. Cl.
CPC ... *H04N 5/232935* (2018.08); *H04N 5/23219* (2013.01); *H04N 5/232939* (2018.08)
(58) Field of Classification Search
CPC ....... H04N 5/232935; H04N 5/232939; H04N 5/23219
See application file for complete search history.

(56) References Cited

U.S. PATENT DOCUMENTS

| | | | | |
|---|---|---|---|---|
| 5,900,909 A | * | 5/1999 | Parulski | H04N 5/232 348/231.6 |
| 2009/0147131 A1 | * | 6/2009 | Mikawa | G11B 27/34 348/445 |
| 2012/0246114 A1 | * | 9/2012 | Edmiston | G06T 11/60 707/625 |
| 2013/0182139 A1 | * | 7/2013 | Brunner | G06K 9/3208 348/222.1 |
| 2014/0071308 A1 | * | 3/2014 | Cieplinski | G06T 7/73 348/222.1 |
| 2015/0098646 A1 | * | 4/2015 | Paris | G06K 9/6202 382/159 |
| 2016/0371828 A1 | * | 12/2016 | Demarty | G06T 7/20 |
| 2018/0293769 A1 | * | 10/2018 | Rusu | G06T 3/60 |

* cited by examiner

*Primary Examiner* — Timothy J Henn
(74) *Attorney, Agent, or Firm* — John M. Rogitz; John L. Rogitz (57) ABSTRACT

In one aspect, a device includes at least one processor, a camera accessible to the at least one processor, a display accessible to the at least one processor, and storage accessible to the at least one processor. The storage includes instructions executable by the at least one processor to generate an image using the camera, to determine a first orientation of at least one object shown in the image, and to save the image in a second orientation determined based on the first orientation.

20 Claims, 6 Drawing Sheets

IMAGE SAVE ORIENTATION DETERMINED BASED ON ORIENTATION OF OBJECT WITHIN IMAGE

FIELD

The present application relates to technically inventive, non-routine solutions that are necessarily rooted in computer technology and that produce concrete technical improvements.

BACKGROUND

As recognized herein, sometimes when taking a digital photograph using a camera on a smart phone or other smart device, the orientation in which the photograph is saved is not the correct save orientation. This might be due to the orientation in which the user was holding the device when taking the photograph (e.g., imaging a document laying on a table), which can confuse the device as to the correct save orientation. As also recognized herein, incorrect save orientations can be frustrating and confusing since this leads to the photograph not being presented at the device in the correct orientation at a later time. Nor is it easy and straightforward to adjust the save orientation of an incorrectly-saved photograph, as also recognized herein. There are currently no adequate solutions to the foregoing computer-related, technological problem.

SUMMARY

Accordingly, in one aspect a device includes at least one processor, a camera accessible to the at least one processor, a display accessible to the at least one processor, and storage accessible to the at least one processor. The storage includes instructions executable by the at least one processor to generate an image using the camera, to determine a first orientation of at least one object shown in the image, and to save the image in a second orientation determined based on the first orientation.

In some implementations, the at least one object may include at least one text character, the first orientation may be determined using optical character recognition, and the image may be saved in the second orientation to show the at least one text character upright in the second orientation. Also in some implementations, the at least one object may include a face of a person, the first orientation may be determined using facial recognition, and the image may be saved in the second orientation to show the face upright in the second orientation. Additionally, the at least one object may include an inanimate object, the first orientation may be determined using object recognition, and the image may be saved in the second orientation to show the inanimate object upright in the second orientation. Still further, the first orientation may be determined using action recognition, and the image may be saved in the second orientation to show the action being performed upright in the second orientation.

Also in some implementations, the instructions may be executable to save the image in the second orientation based on the second orientation being determined with a predefined level of confidence, and to prompt the user to provide input regarding a save orientation for image based on the second orientation not being determined with the predefined level of confidence. So, for example, the user may be prompted at least in part by presenting a graphical user interface (GUI) on the display. The GUI may indicate a first proposed save orientation and a second proposed save orientation, where each of the first and second proposed save orientations may be selectable to establish an actual save orientation. The predefined level of confidence itself may be established by an end-user of the device.

In another aspect, a method includes generating, at a device, an image using a camera and then determining, with a first level of confidence, a first image orientation for the image based on a first object orientation for a first object shown in the image. Responsive to the first level of confidence being above a predefined threshold level of confidence, the method includes saving the image in the first image orientation determined based on the first object orientation. Responsive to the first level of confidence being below the predefined threshold level of confidence, the method includes presenting a prompt at the device requesting that an end-user provide input specifying an actual save orientation for the image. The predefined threshold level of confidence may be set by the end-user.

In certain implementations, the image may be a first image and the method may include learning, over time and using the device, the end-user's preferred save orientation for a particular type of image. The method may then include determining that a second image from the camera is associated with the particular type of image, and saving the second image in the end user's preferred save orientation. The saving of the second image may be performed without prompting the end-user to specify an actual save orientation for the second image.

In certain examples, the first object may include at least one text character, the first object orientation may be determined using optical character recognition, and the image may be saved in the first image orientation to show the at least one text character upright in the first image orientation.

Also in certain examples, the first object orientation may be determined using one or more of facial recognition, object recognition, and/or action recognition. In these examples, the image may be saved in the first image orientation to show the first object upright in the first image orientation.

Additionally, note that in certain implementations the prompt may include a visual prompt presented on a display accessible to the device, where the visual prompt may show the image in at least two different proposed save orientations. Each proposed save orientation may be selectable to establish the actual save orientation.

In still another aspect, at least one computer readable storage medium (CRSM) that is not a transitory signal includes instructions executable by at least one processor to generate, at a device, an image using a camera and to determine a first image orientation based on an orientation of a first object shown in the image. The instructions are also executable to save the image in the first image orientation determined based on the first object orientation.

In certain implementations, the instructions may also be executable to determine, with a first level of confidence, the first image orientation and then to save the image in the first image orientation responsive to the first level of confidence being above a predefined threshold level of confidence. In these implementations, the instructions may also be executable to, responsive to the first level of confidence being below the predefined threshold level of confidence, present a prompt on a display accessible to the device. The prompt requests user input to indicate a save orientation for the image.

In various examples, the first object orientation may be determined using one or more of optical character recognition, facial recognition, object recognition, and/or action recognition.

The details of present principles, both as to their structure and operation, can best be understood in reference to the accompanying drawings, in which like reference numerals refer to like parts, and in which:

DETAILED DESCRIPTION

Among other things, the present application discloses generating an image using a camera on a device, whether the associated camera application is launched directly or through a social media application or otherwise. The device may then determine a media save orientation for an image to a threshold level of confidence and then save the image in that save orientation. If the threshold level of confidence is not reached or the output is otherwise ambiguous, the device may prompt the user for the desired media save orientation responsive to image capture, e.g., using multi-factor confidence thresholds. The device itself may be, for example, a smart phone or a stand-alone digital camera.

For example, a device may use facial or object recognition as a confidence factor and establish a confidence level in a captured orientation of an image. If the confidence level reaches a threshold level of confidence, no additional action from the user may be requested and the image may be saved according to the orientation. However, if the threshold level of confidence is not reached, the device can prompt the user for the user's intended or preferred save orientation. In some examples, the threshold level of confidence may be configured by the user to eliminate undesired prompts.

Thus, for example, the device may identify a tree as an object within an image and determine that the tree in the image's current orientation is shown upside down. The device may therefore rotate the image in the X-Y plane by one hundred eighty degrees and set that new orientation as the save orientation for the image. In this way, the image as saved in the save orientation may be presented right-side up in thumbnail view or in full image view when a request to view stored images (or a list of thumbnails) is received from a user at a later time without the user having to provide additional input to rotate the image to view it upright.

Prior to delving further into the details of the instant techniques, note with respect to any computer systems discussed herein that a system may include server and client components, connected over a network such that data may be exchanged between the client and server components.

The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
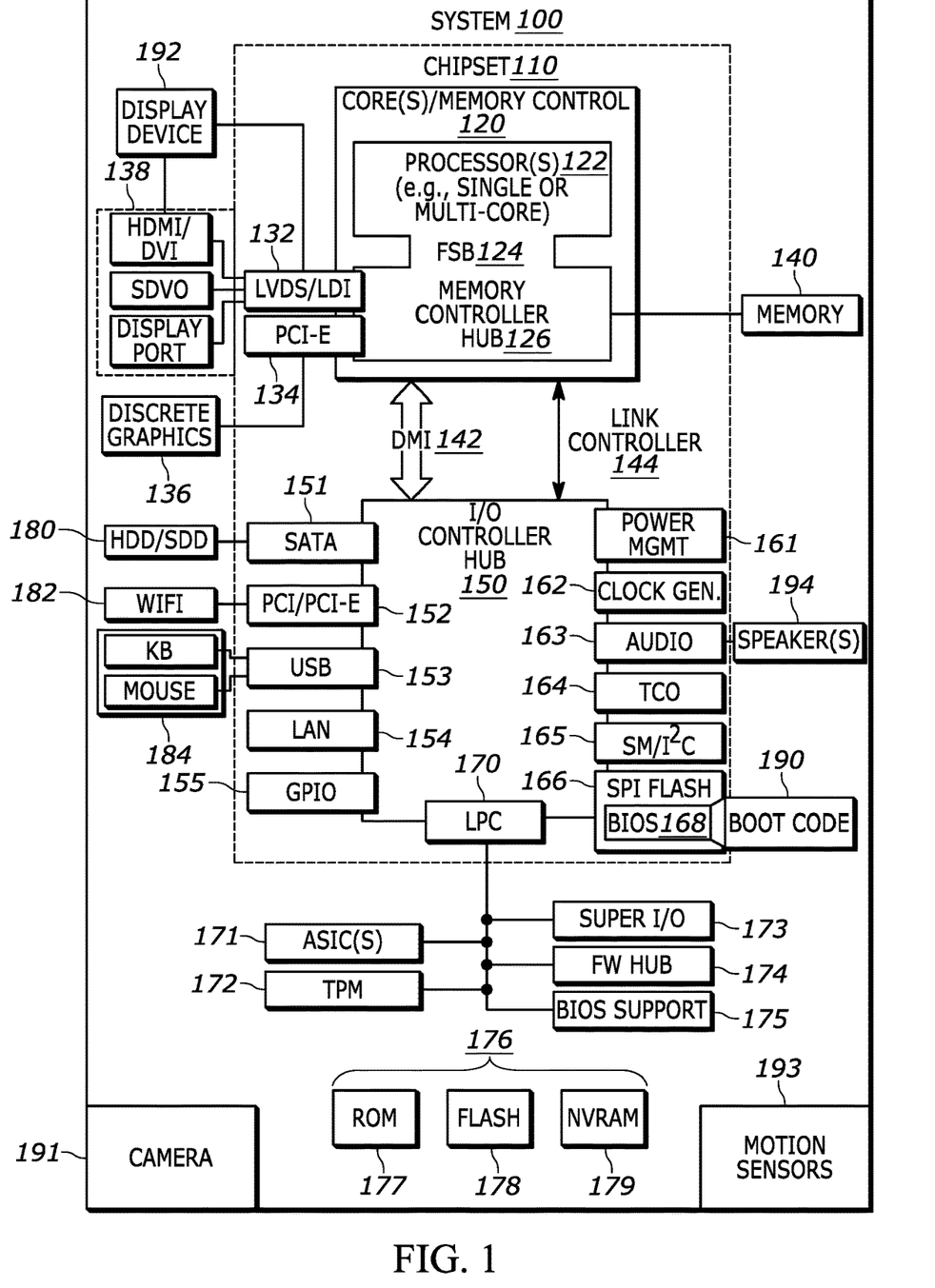
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a camera 191 that gathers one or more images (e.g., digital photographs) and provides them to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

As also shown in FIG. 1, the system 100 may include one or more motion sensors 193 such as a gyroscope that senses and/or measures the orientation of the system 100 and provides related input to the processor 122, as well as an accelerometer that senses acceleration and/or movement of the system 100 and provides related input to the processor 122.

Additionally, though not shown for simplicity, in some embodiments the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
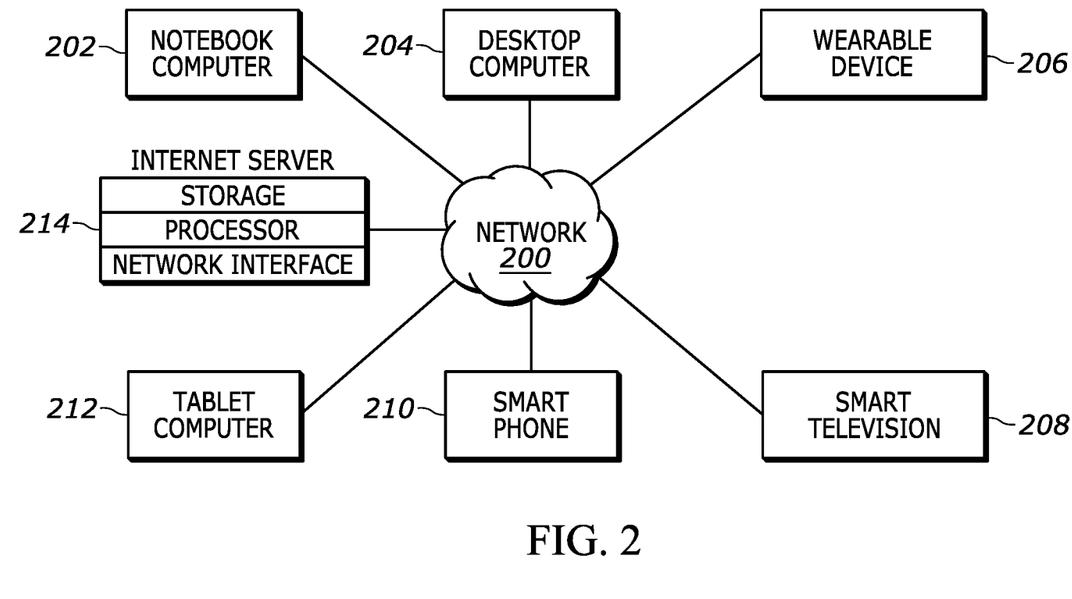
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
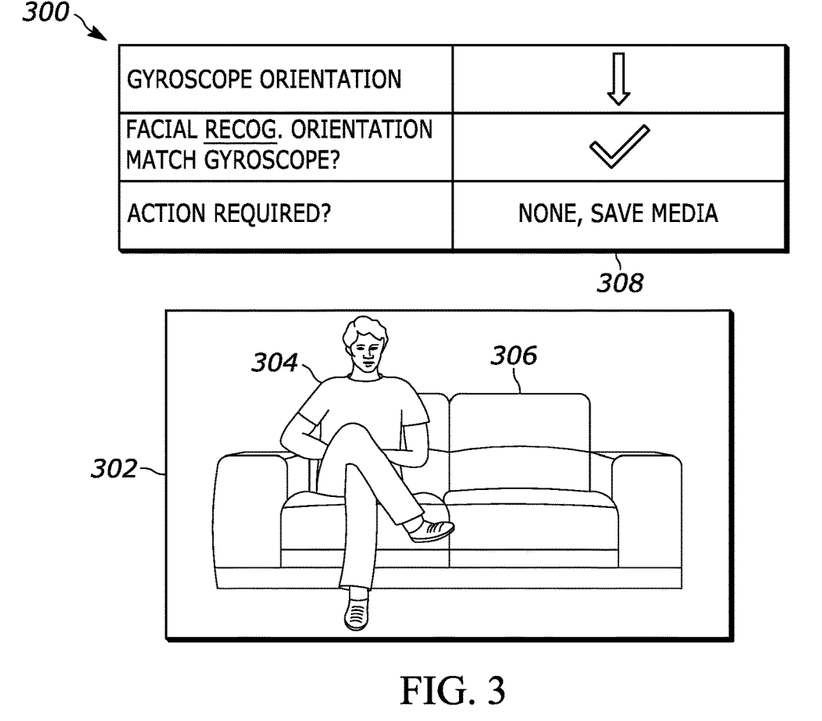
FIGS. 3 and 4 show explanatory diagrams for determining a save orientation for an image consistent with present principles.

Referring now to FIG. 3, an explanatory diagram 300 is shown. The diagram 300 shows an image 302 of a person 304 sitting upright on a couch 306. The diagram 300 also shows a table 308. The top row of the table 308 indicates that a gyroscope within the end user's device that generated the image 302 has determined a portrait save orientation for the image 302. The middle row of the table 308 indicates that the device has determined, using facial recognition, that the save orientation for the image 302 should also be a portrait save orientation in order to show the face of the person 304 upright when the image 302 is presented at a later time on the device's display from local or cloud storage. The bottom row of the table 308 indicates that the end-user need not be prompted by the device to indicate a save orientation for the image 302 and instead that the device can simply save the image 302 itself in cloud or local storage in portrait orientation.

Figure 4:
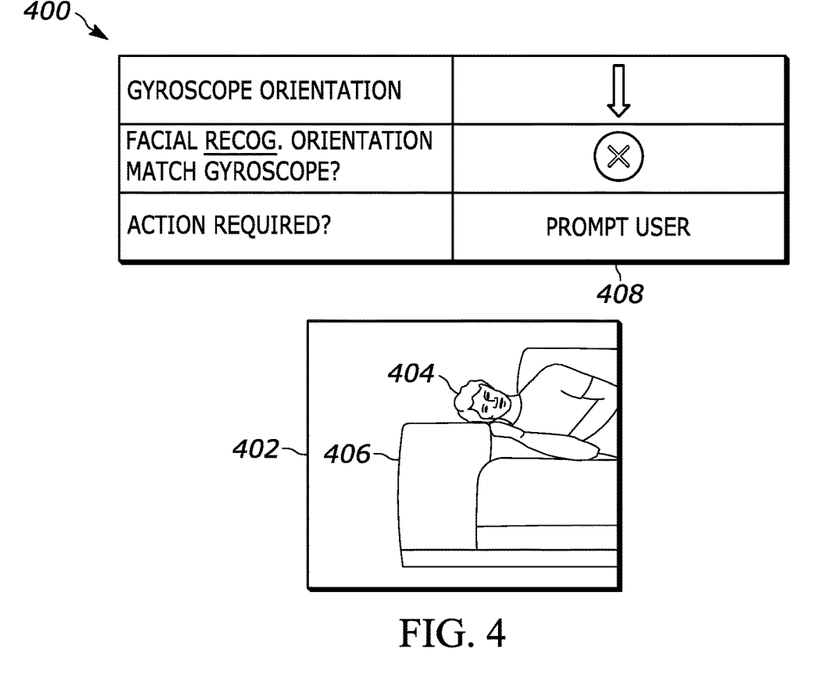

Now describing FIG. 4, an image 402 is shown as part of an explanatory diagram 400. The image 402 shows a person 404 laying down sideways on a couch 406. The diagram 400 also shows a table 408. The top row of the table 408 indicates that a gyroscope within the end user's device that generated the image 402 has determined a portrait save orientation for the image 402.

However, contrasting with FIG. 3, the middle row of the table 408 in this case indicates that the device has determined, using facial recognition, an orientation conflict in that the save orientation for the image 402 should instead be a landscape save orientation in order to show the face of the person 404 upright when the image 402 is presented on the device's display from local or cloud storage at a later time. Thus, the bottom row of the table 408 indicates that the end user's device should prompt the user to provide a preferred save orientation for the image 402 so that the device can save the image 402 in cloud or local storage in the user's preferred save orientation.

With the foregoing in mind, it is to be understood consistent with present principles that an image that has been generated using the device's camera may be saved in various orientations when the device has a level of confidence that a given save orientation that is determined is above a predefined threshold level of confidence for saving images without prompting the user. Fuzzy logic algorithms may be used for such purposes, and one or multiple factors may contribute to the device's level of confidence in correctly determining a save orientation for a given image. For example, a save orientation determined from gyroscope input matching a save orientation determined based on facial recognition (as discussed in the example of FIG. 3) may alone give the device a level of confidence that matches or exceeds the threshold level of confidence. However, in other examples the threshold level of confidence may also be reached in combination with other factors. The various weights for the values/results of each individual factor that may in turn contribute to the overall determined level of confidence may be set by the device's manufacturer, software developer, or end-user, as may the predefined threshold level of confidence itself.

As for other factors that might contribute to the device's level of confidence that it has correctly determined an appropriate save orientation for an image, those factors may include execution of any of facial, object, and action recognition to determine an image orientation that matches an orientation of an object within the image that shows the object right side up. Another factor may relate to optical character recognition (OCR) being used to determine an image orientation that matches an orientation of text characters within the image (e.g., letters, numbers, or symbols) that show the text characters right side up.

Moreover, note that respective weighted values for a same image orientation as determined based on different respective factors may be added together to reach the device's overall level of confidence in that particular save orientation being correct. For example, if an image shows both a person and an inanimate object like the couch in the example of FIG. 3 above, then facial and object recognition may be respectively used to individually determine a portrait image orientation since that image orientation matches an upright orientation for both the person and inanimate object individually. The device may then add up the weighted values from both of those factors for the result of portrait orientation to render the device's overall level of confidence in portrait image orientation being correct. The device may then determine whether that overall level of confidence matches or exceeds the predefined threshold level of confidence. If the overall level of confidence does in fact match or exceed the predefined threshold level, then the device may save the image in portrait orientation. This may occur even if weighted values for landscape orientation (or another orientation) have also been determined for the same image but for other objects shown in the image, but do not result in an overall level of confidence in landscape image orientation that matches or exceeds the predefined threshold.

Additionally, note that portrait orientation itself may entail the height of the image in the Y dimension being greater than the length of the image in the X dimension, while landscape orientation may entail the height of the image in the Y dimension being less than the length of the image in the X dimension. Also note that while portrait and landscape orientations have been discussed above, other types of orientations may also be determined consistent with present principles. For example, image orientation may be defined by four potential orientations for a same image, where each orientation corresponds to a different ninety-degree rotation of the image in the X-Y plane. Those various rotations may be established by either one of the X or Y axes for the image being parallel to one of either of the X or Y axes of the device's display.

Figure 5:
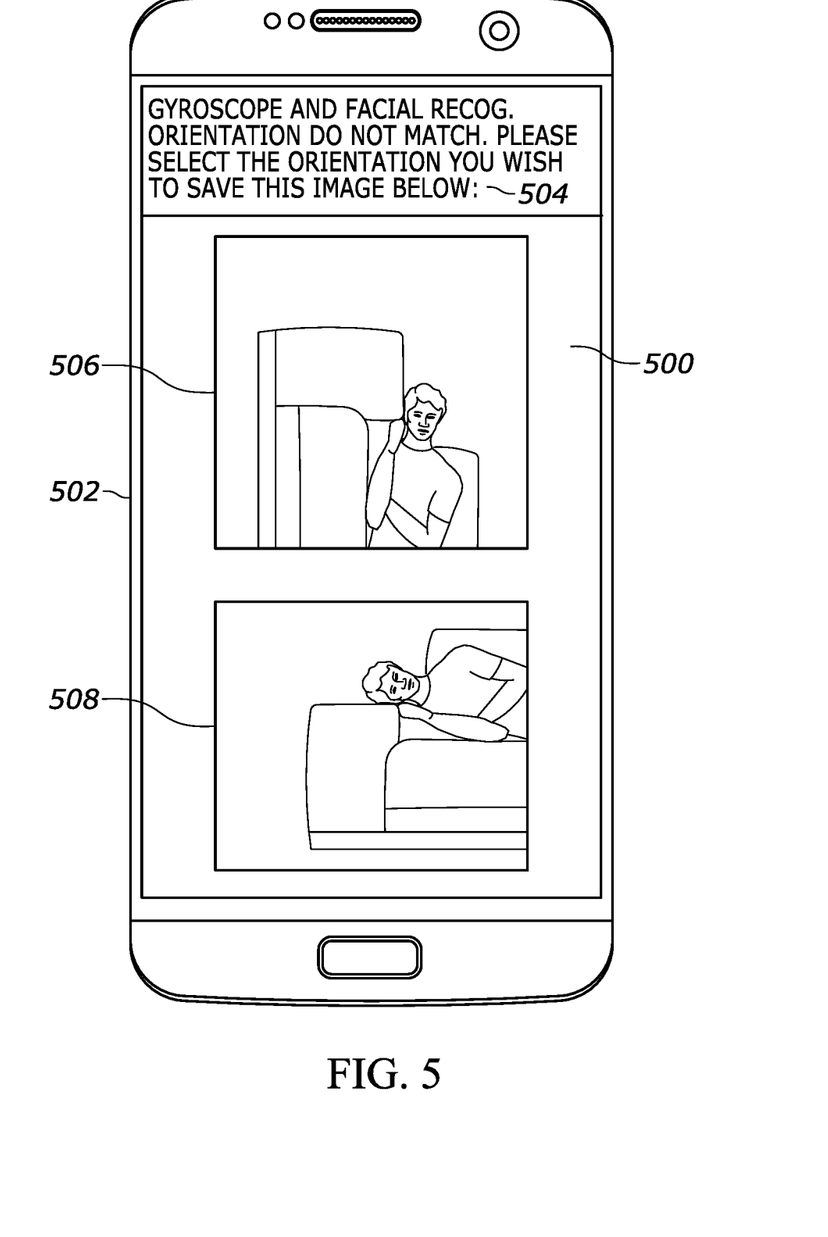
FIG. 5 shows an example visual prompt presented on a display for a user to select a preferred save orientation for an image consistent with present principles.

Continuing the detailed description in reference to FIG. 5, it shows a graphical user interface (GUI) 500 as presented on the touch-enabled display of a smart phone 502 consistent with present principles. Borrowing from the example of FIG. 4 above, the GUI 500 may establish a visual prompt to the end-user that the end user should specify a preferred save orientation for the image 402 since the smart phone 502 has not determined a save orientation for the image 402 to a sufficient level of confidence.

As shown in FIG. 5, the GUI 500 may include text 504 prompting the user to select an actual save orientation for the image 402 since the save orientations determined from gyroscope input and facial recognition do not match. Accordingly, a selector 506 may be presented on the GUI 500 and may be selectable by the end-user to provide input specifying a first preferred save orientation for the image 402 that corresponds to/matches the proposed orientation shown on the selector 506 itself, which in this case is the image 402 in an orientation showing the face of the person 404 upright as determined based on facial recognition. The GUI 500 may also include a selector 508 that may be selectable by the end-user to provide input specifying a different preferred save orientation for the image 402 that corresponds to/matches the proposed orientation shown on the selector 508 itself, which in this case is the image 402 in an orientation showing the couch 406 upright as determined based on object recognition (and/or an orientation determined according to input from a gyroscope in the smart phone 502 that was provided when the image 402 was initially generated using the smart phone's camera).

Note that each of the selectors 506, 508 may be selectable from the GUI 500 using touch or cursor input, for example. Also note that other types of prompts may also be provided by the smart phone 502 in addition to or in lieu of the visual prompt shown in FIG. 5. For example, an audible prompt that reads the text 504 aloud using the smart phone's speaker may be presented while the selectors 506, 508 are presented on the smart phone's display.

Tactile prompts may also be provided using a vibrator within the smart phone 502. For example, the selectors 506, 508 (but possibly not the text 504) may be presented along with vibrating the smart phone 502 at a predetermined intensity and for a predetermined length of time to prompt the user to make a selection from among the selectors 506, 508.

Note even further that while only two proposed save orientations are shown in FIG. 5 via the respective selectors 506, 508, other proposed save orientations beyond those two may also be indicated using a prompt if the device has determined three or more potential save orientations, none of which that may have been determined to a level of confidence rising to the threshold level. Accordingly, an additional selector may be presented on the smart phone's display for each additional proposed save orientation, and each of those additional selectors may visually show the image in the respective proposed save orientation itself.

Figure 6:
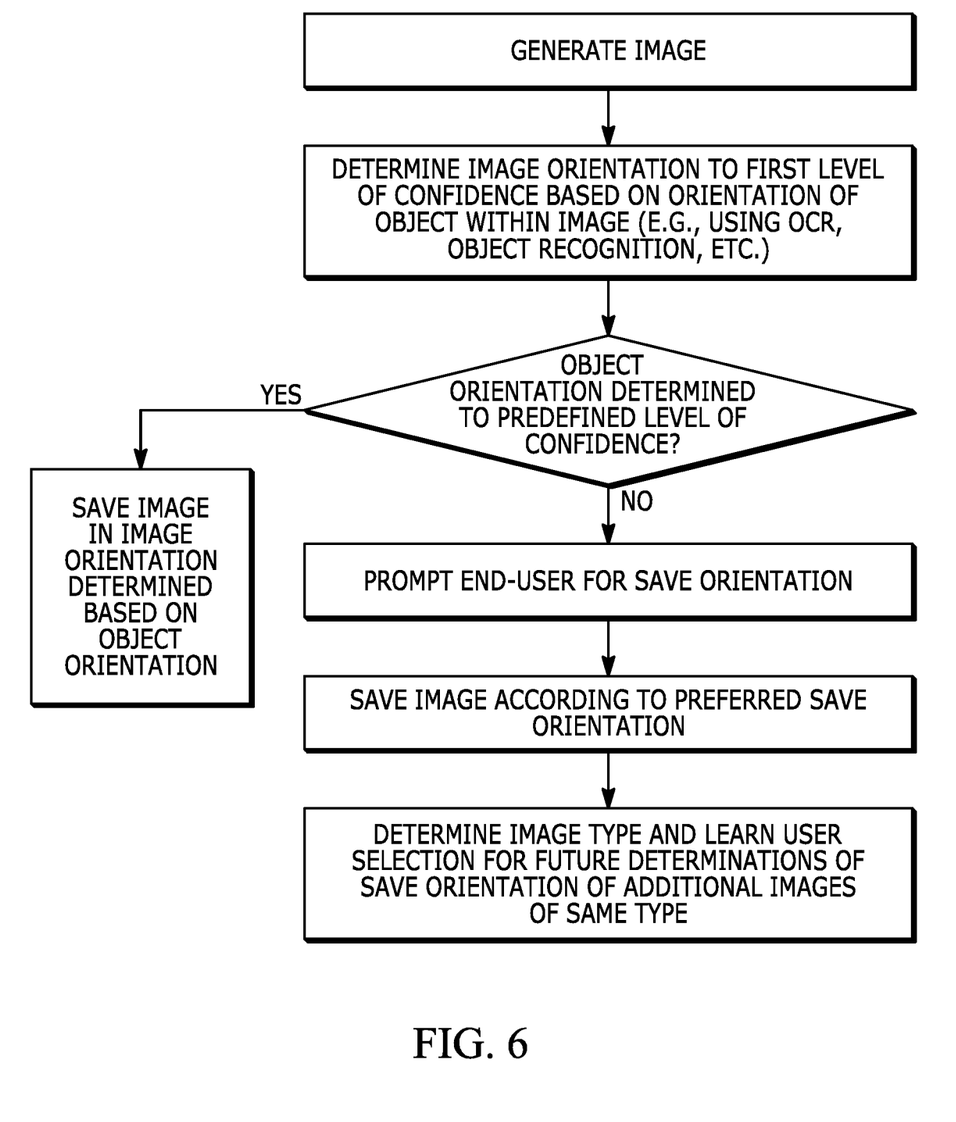
FIG. 6 is a flow chart of an example algorithm consistent with present principles.

Now describing FIG. 6, it shows example logic that may be executed by a device such as the smart phone 502 and other devices described herein consistent with present principles. Beginning at block 600, the device may generate an image using a camera on or in communication with the device. The image may be generated responsive to user command to generate the image, for example.

From block 600 the logic may proceed to block 602. At block 602 the device may determine the respective orientations of respective different objects shown within the image to determine one or more potential image orientations. Note that each potential image orientation may be determined to a different level of confidence including, for example, a first level of confidence for a first image orientation identified based on the orientation of a first object within the image (e.g., identified using OCR, object recognition, etc.).

After block 602 the logic may proceed to decision diamond 604. At diamond 604 the device may determine whether the associated level of confidence for any of the potential image orientations is above a predefined threshold level of confidence, including whether the first level of confidence is above the predefined threshold.

An affirmative determination at diamond 604 may cause the logic to proceed to block 606. At block 606 the device may save the image in one of the potential image orientations that was determined with a level of confidence that exceeds the predefined threshold. If more than one potential image orientation was determined with a level of confidence exceeding the threshold, the respective image orientation with the highest level of confidence may be selected to in turn save the image in that respective image orientation.

However, if a negative determination is made at diamond 604 instead, then the logic may instead move from diamond 604 to block 608. At block 608 the device may prompt the end-user to specify a save orientation as described herein. From block 608 the logic may then proceed to block 610 where the device may receive corresponding input from the end-user and then save the image according to the preferred save orientation indicated via the user input.

Note that at either of blocks 606 or 610, the image may be saved in local storage such as a local hard disk or solid state storage drive on the device. Additionally or alternatively, the image may be saved in cloud storage hosted at a server accessible to the device.

Still describing FIG. 6, from block 610 the logic may proceed to block 612. At block 612 the device may determine an image type associated with the image generated at block 600. Also at block 612, the device may then learn the user's selection of the image orientation for that image for future determinations of save orientations of additional images of the same image type.

The type of image may be determined using, for example, object recognition to identify an object shown in the image. The device may then associate the object type for the object with an image type. For example, the device may use object recognition and OCR to learn over time that the user prefers to save images of receipts in either portrait or landscape orientation, and then the device may save future pictures of receipts in the same preferred orientation in the future without prompting the user to specify a save orientation. Different image types may also be determined based on different actions as recognized using action recognition, as another example. As still another example, facial recognition may also be used to classify images by whether they show a person or not.

As for device learning, one or more artificial intelligence models employing one or more artificial neural networks may be used for such purposes. For example, deep and/or recurrent neural networks may be used for making inferences about correct save orientations for different image types, where the neural network(s) may be trained unsupervised by the device over time based on various user inputs selecting various image save orientations for different types of images when prompted. Training may entail the device adjusting weights of various layers/nodes within the neural network(s) to more-confidently make inferences in the future about preferred save orientations for various image types.

Figure 7:
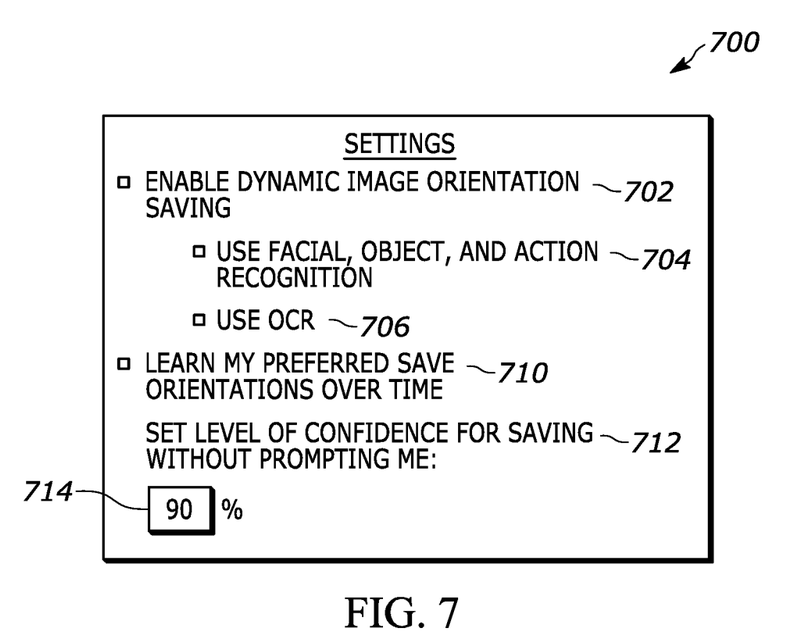
FIG. 7 shows an example graphical user interface (GUI) that may be presented on a display to configure one or more settings of a device consistent with present principles.

Now describing FIG. 7, it shows an example graphical user interface (GUI) 700 that may be presented on the display of a device configured to undertake present principles. The GUI 700 may be presented to configure one or more settings of the device. Each of the options or sub-options to be discussed below may be selected in this example by directing touch or cursor input to the adjacent check box.

As shown in FIG. 7, the GUI 700 may include a first option 702 that may be selectable to set or configure the device to undertake present principles. For example, the first option 702 may be selected to enable the device to, in the future, undertake the functions described above in reference to FIGS. 3-5 and to execute the logic of FIG. 6.

The GUI 700 may also include sub-options 704, 706. Sub-option 704 may be selectable to set the device to use facial recognition, object recognition, and/or action recognition to determine an image save orientation consistent with present principles. Sub-option 706 may be selectable to set the device to use OCR to determine an image save orientation consistent with present principles.

FIG. 7 also shows that the GUI 700 may include an option 710 to set or configure the device to learn the user's preferred save orientations over time for different types of images. For example, selection of the option 710 may enable the device to undertake the functions described above in reference to block 612.

Additionally, in some examples the GUI 700 may include a setting 712 at which an end-user of the device may specify a threshold level of confidence for the device to use when making image save orientation determinations consistent with present principles. Thus, numerical input to input box 714 may be provided by the user using a hard or soft keyboard. In this example, an end-user has set the predefined threshold level of confidence at ninety percent.

Describing action recognition and how it may be used consistent with present principles, note that an action recognition algorithm may be used in addition to or in lieu of facial recognition and/or object recognition algorithms in order to identify an action being performed by a human or other living thing, and to also determine in which image orientation the action will appear as being performed right side up when the image is viewed (e.g., swinging a golf club, jogging, etc.). That image orientation may then be selected as a potential save orientation for the image when determining a level of confidence in that potential save orientation.

Before concluding, also note that present principles may apply not just to still images but also to video or motion pictures as well.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a camera accessible to the at least one processor;
   a display accessible to the at least one processor; and
   storage accessible to the at least one processor and comprising instructions executable by the at least one processor to:
   generate an image using the camera;
   determine a first orientation of at least one object shown in the image;
   save, based on a second orientation being determined with a predefined level of confidence, the image in the second orientation, the second orientation determined based on the first orientation; and
   prompt, based on the second orientation not being determined with the predefined level of confidence, the user to provide input regarding a save orientation for the image, wherein the user is prompted at least in part by presenting a graphical user interface (GUI) on the display, wherein the GUI indicates a first proposed save orientation and a second proposed save orientation, each of the first and second proposed save orientations being selectable to establish an actual save orientation.

2. The device of claim 1, wherein the GUI comprises text prompting the user to select the actual save orientation.

3. The device of claim 1, wherein the GUI comprises a first selector that is selectable to establish the first proposed save orientation as the actual save orientation, and wherein the GUI comprises a second selector that is selectable to establish the second proposed save orientation as the actual save orientation.

4. The device of claim 3, wherein the first selector shows the image according to the first proposed save orientation, and wherein the second selector shows the image according to the second proposed save orientation.

5. The device of claim 1, wherein the instructions are executable to:
audibly prompt, via at least one speaker and based on the second orientation not being determined with the predefined level of confidence, the user to provide input regarding a save orientation for the image.

6. The device of claim 5, comprising the at least one speaker.

7. The device of claim 5, wherein the audible prompt reads aloud text presented on the GUI, the text prompting the user to select the actual save orientation.

8. The device of claim 1, wherein the instructions are executable to:
tactilely prompt, via at least one vibrator and based on the second orientation not being determined with the predefined level of confidence, the user to provide input regarding a save orientation for the image.

9. The device of claim 8, comprising the at least one vibrator.

10. The device of claim 1, wherein the GUI indicates a respective proposed save orientation for each potential save orientation determined from the image, each of the respective proposed save orientations being selectable to establish the actual save orientation.

11. The device of claim 10, wherein the respective proposed save orientations that are indicated via the GUI are greater than two.

12. The device of claim 10, wherein each of the respective proposed save orientations has been determined to be a potential save orientation but not to the predefined level of confidence.

13. A method, comprising:
generating, at a device, an image using a camera;
determining, with a first level of confidence, a first image orientation for the image based on a first object orientation for a first object shown in the image;
responsive to the first level of confidence being above a predefined threshold level of confidence, saving the image in the first image orientation determined based on the first object orientation; and
responsive to the first level of confidence being below the predefined threshold level of confidence, presenting a prompt at the device requesting that an end-user provide input specifying an actual save orientation for the image;
wherein the prompt comprises a visual prompt presented on a display accessible to the device, and wherein the visual prompt shows the image in at least two different proposed save orientations, each proposed save orientation being selectable to establish the actual save orientation.

14. The method of claim 13, wherein the visual prompt is presented as part of a graphical user interface (GUI) presented on the display, the GUI comprising a first selector that is selectable to establish a first proposed save orientation as the actual save orientation, the GUI comprising a second selector that is selectable to establish a second proposed save orientation as the actual save orientation.

15. The method of claim 14, wherein the first selector shows the image according to the first proposed save orientation, and wherein the second selector shows the image according to the second proposed save orientation.

16. The method of claim 14, wherein the GUI comprises text prompting the end-user to select the actual save orientation.

17. The method of claim 14, comprising:
audibly prompting, via at least one speaker and based on the first level of confidence being below the predefined threshold level of confidence, the end-user to provide input specifying the actual save orientation for the image.

18. The method of claim 17, wherein the audible prompt reads aloud text presented on the GUI, the text prompting the user to select the actual save orientation.

19. At least one computer readable storage medium (CRSM) that is not a transitory signal or a signal per se, the computer readable storage medium comprising instructions executable by at least one processor to:
generate, at a device, a first image using a camera;
identify a first object type for an object shown in the first image;
save, based on user input, the first image in one of portrait orientation or landscape orientation;
learn over time that a user prefers to save images showing objects of the first object type in one of portrait orientation or landscape orientation; and
save additional images showing objects of the same type as the first object type in the user's preferred save orientation of portrait orientation or landscape orientation, the additional images saved in the user's preferred save orientation without prompting the user to specify a save orientation for the additional images.

20. The CRSM of claim 19, wherein the instructions are executable to:
present a graphical user interface (GUI) on a display accessible to the at least one processor, the GUI being usable to configure one or more settings of the device, the GUI comprising at least a first option that is selectable to set the device to, in the future, learn the user's preferred save orientation(s) over time.

* * * * *